United States Patent Office 3,550,440
Patented Dec. 29, 1970

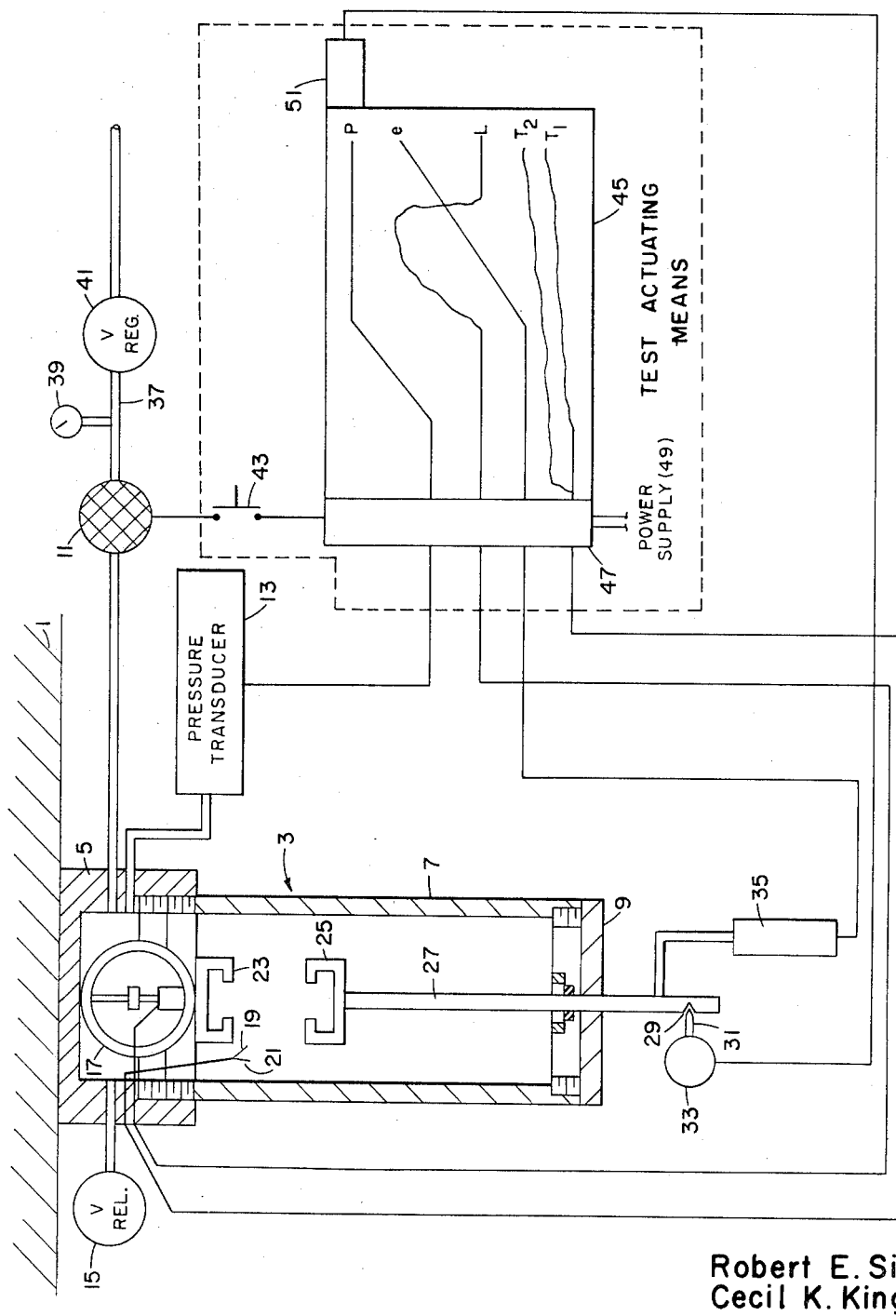

3,550,440
PRESSURIZED TENSILE TEST APPARATUS
Robert E. Siron and Cecil K. King, Huntsville, Ala., assignors to the United States of America as represented by the Secretary of the Army
Filed Jan. 8, 1969, Ser. No. 789,671
Int. Cl. G01n 3/08
U.S. Cl. 73—90
8 Claims

ABSTRACT OF THE DISCLOSURE

An apparatus for testing specimens in tension under pressure. The apparatus includes a pressure chamber, a source of pressure, an oscillograph recorder and operating controls for the apparatus. The chamber has a load cell disposed therein, a pair of specimen holders one of which is fixed to the load cell and the other holder is mounted on a crosshead extension rod for slidable movement relative to the chamber. A pressure transducer is connected to the chamber and furnishes a pressure reading to the recorder. A galvanometer light beam monitors the preset test pressure level on the recorder and when the pressure reading from the pressure transducer reaches the recorder preset level the galvanometer activates a photocell to trigger the tester crosshead and thereby start the test.

BACKGROUND OF THE INVENTION

This invention relates to the field of specimen testing under pressure. A problem with test apparatus currently in use is that they are manually actuated which results in a large variation in initiation time of the test and consequently a variation in the temperature of the specimen.

SUMMARY OF THE INVENTION

The apparatus of this invention has utilized an oscillograph recorder for recording the parameters of the test as well as using the recorder to automatically initiate the actual tensile test. This insures a minimum of test-to-test variability in delay time between pressurization and start of test. The operator starts the test sequence by closing a switch which activates the recorder and pressurizes the chamber. When the pressure in the chamber reaches the test level that has been preset on the recorder, the galvanometer light beam strikes and activates a photocell which in turn triggers the tester crosshead and consequently applies a load to the specimen.

This invention may be better understood from the following detailed description taken in conjunction with the accompanying drawings.

BRIEF DESCRIPTION OF THE DRAWINGS

The single figure is a schematic of the components of the apparatus.

In the figure, reference numeral 1 indicates the crosshead that supports a pressure chamber generally indicated by numeral 3. The pressure chamber includes an upper chamber head 5, a cylinder 7 and a lower chamber head 9. Several components of the apparatus are mounted at different points around the upper chamber head and extend through the head into the chamber. These components are pressure inlet solenoid valve 11, pressure transducer or sensor 13, pressure relief safety valve 15, load cell 17 and thermocouple sensors 19 and 21. The load cell measures the tensile load on the specimen. One thermocouple sensor is inserted into a dummy sample of the specimen material and the other thermocouple sensor measures the temperature of the gas in the chamber. Load cell 17, of a known ring type, is connected within upper chamber 5 and has upper specimen holder 23 mounted thereon. A lower specimen holder 25 is mounted on a movable extension rod 27 that extends through lower chamber head 9 for relative movement thereto. Extension rod 27 has a notch 29 near the lower end of the rod for engagement with an arm 31 of electro-mechanical solenoid 33. When arm 31 is in engagement with the notch, extension rod 27 is held in position until solenoid 33 is actuated. After the arm has been withdrawn from notch 29 the extension rod will be driven at a preset constant rate by a load applying force, not shown. A linear motion potentiometer 35 is operatively associated with the extension rod to measure the movement of the rod and thus the extension imposed on the specimen. Reference numeral 37 indicates a gas conduit connected to a source of gas pressure (not shown) while numeral 39 indicates a gas pressure gage and numeral 41 shows a pressure regulator mounted in conduit 37.

The test actuating means includes a switch 43 for starting the chart paper of oscillograph recorder 45 through the recorder controls 47, power supply 49 and a photocell 51 that operates solenoid 33. Photocell 51 is activated in response to the recorder input from pressure transducer 13. The oscillograph recorder includes a movable chart of light sensitive paper for registering the outputs: chamber pressure buildup from the pressure transducer and designated as P on the chart; load cell reading from sensor 17 designated as L; specimen temperature from thermocouple 19 designated as $T_1$; gas temperature from thermocouple 21 designated as $T_2$ and the test specimen extension from potentiometer designated as $e$. A galvanometer (not shown) is connected to each of the inputs in the recorder for registering the input reading on the chart. Photocell 51 is optically connected with the galvanometer associated with the input of the pressure transducer so that the photocell is activated at a preset test pressure level.

The operation of the test apparatus is as follows: The recorder is calibrated for the outputs of all the data sensors and photocell 51 is adjusted to be activated at a desired test pressure level. The chamber is opened, the test specimen is fixed in position between upper specimen holder 23 and lower specimen holder 25, thermocouple sensor 19 is inserted into the dummy specimen and the chamber is closed. The test sequence is then started by closing switch 43, the recorder chart starts moving and solenoid valve 11 opens to allow pressure buildup in the pressure chamber. When the pressure in the chamber reaches the preset pressure level the galvanometer light associated with the input of the pressure transducer will activate photocell 51 which in turn operates solenoid 33 to withdraw arm 31 from the notch 29 in extension rod 27 and the rod now applies an extension and thus a tensile load on the specimen. All input readings from the various sensors are registered on the recorder. At the end of the test the operator stops the recorder, depressurizes the chamber, opens the chamber, removes the broken test specimen, returns the extension rod to the pretest position and the apparatus is ready for another test.

We claim:

1. An apparatus for testing specimens under pressure comprising: a pressure chamber; a gas conduit for supplying gas to said chamber; a load cell disposed in said chamber; a pair of specimen holders mounted in said chamber, one specimen holder fixed to said load cell and the second specimen holder mounted on a crosshead extension rod provided with a notch and disposed for slidable movement relative to said first specimen holder and to said chamber; a pressure transducer connected to said chamber; an oscillograph recorder for receiving data input from the pressure transducer and other data inputs from said pressure chamber, and test actuation means operatively connected to said extension rod.

2. An apparatus as defined in claim 1 wherein said test actuation means includes a photocell optically connected to said pressure transducer input and activated at a preset level thereof to control movement of said extension rod.

3. An apparatus as defined in claim 2 wherein said apparatus includes an electro-mechanical solenoid operatively connected to said photocell and to said extension rod by an arm of the solenoid engaging said notch.

4. An apparatus as defined in claim 3 including a pressure regulator in said conduit.

5. An apparatus as defined in claim 4 wherein said conduit includes a pressure inlet solenoid valve.

6. An apparatus as defined in claim 5 wherein said apparatus includes a linear motion potentiometer secured to said extension rod to measure linear movement thereof.

7. An apparatus as defined in claim 6 wherein said conduit includes a pressure gage.

8. An apparatus as defined in claim 7 wherein said pressure chamber is provided with a pressure relief valve.

References Cited

UNITED STATES PATENTS 3,481,190   12/1969   Inoue _____ 73—94

JERRY W. MYRACLE, Primary Examiner

U.S. Cl. X.R.

73—95